June 18, 1963
U. FILIPOZZI
3,094,313
RELEASABLE LOAD-SUSPENSION DEVICE
Filed July 6, 1961
2 Sheets-Sheet 1
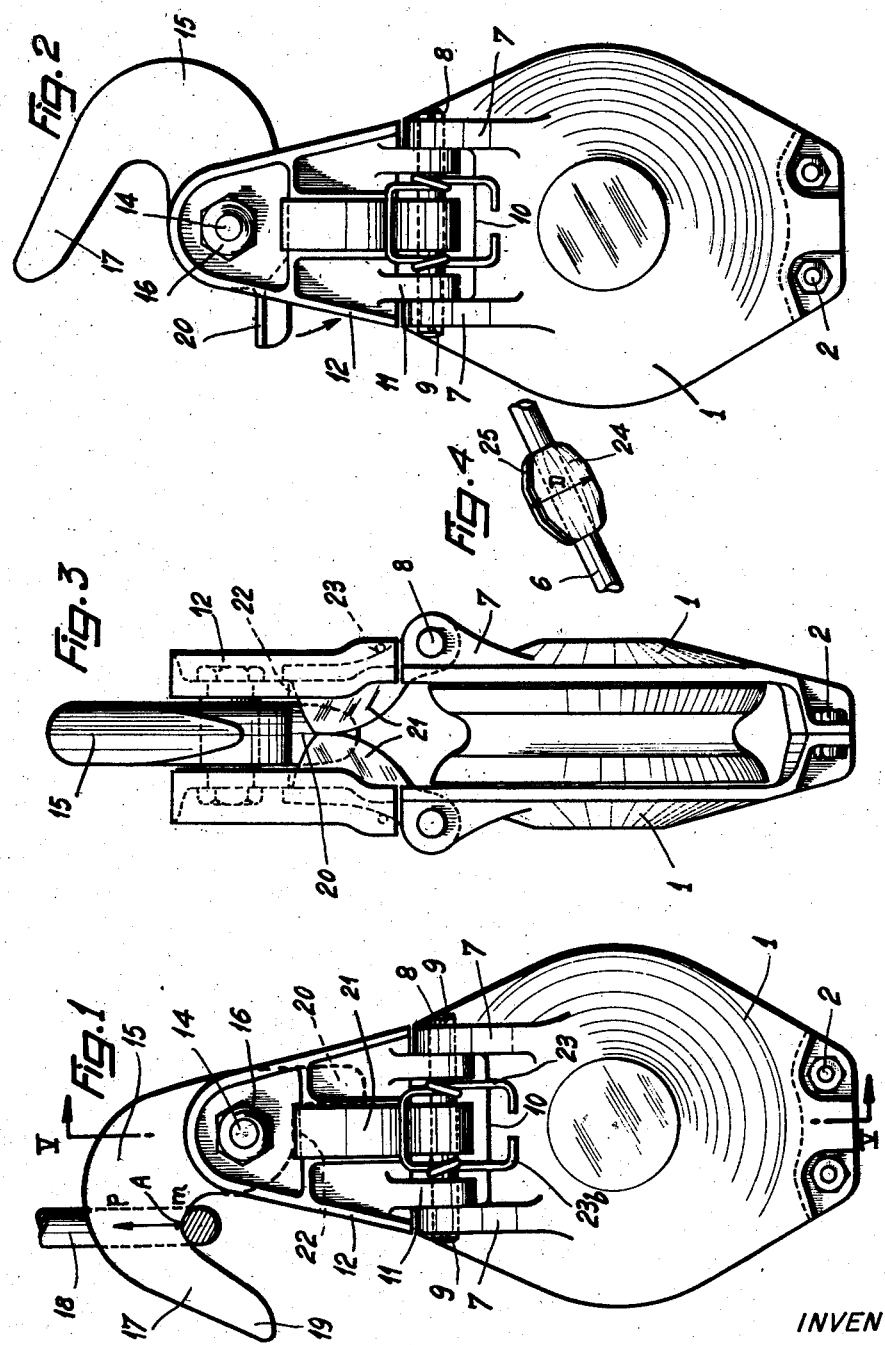
INVENTOR
Urbain Filipozzi
ATTORNEYS June 18, 1963 U. FILIPOZZI 3,094,313
RELEASABLE LOAD-SUSPENSION DEVICE
Filed July 6, 1961 2 Sheets-Sheet 2
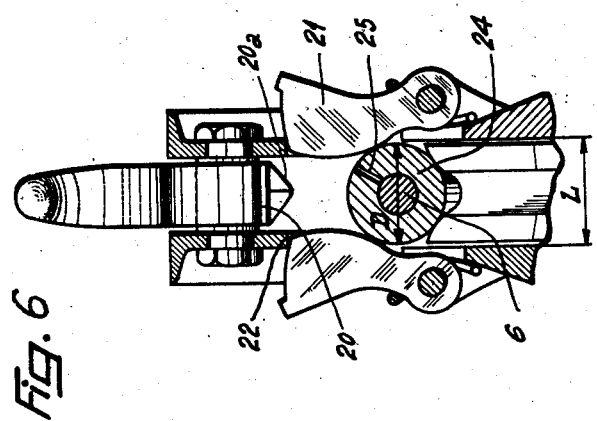
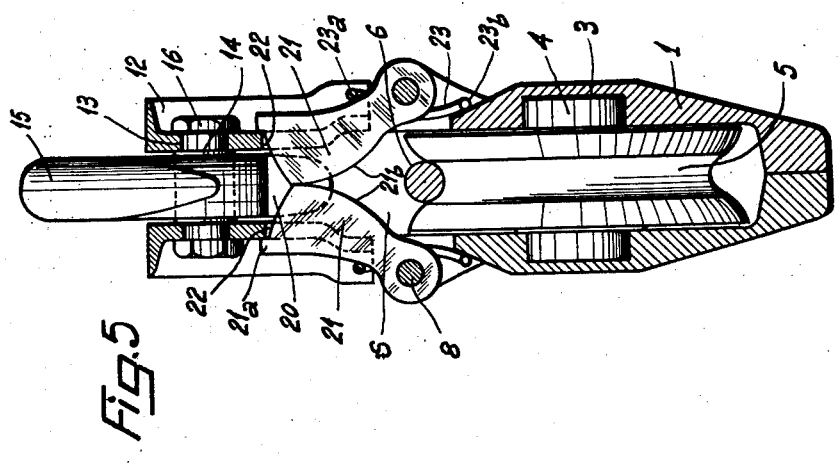
INVENTOR
Urbain Filipozzi
ATTORNEYS

United States Patent Office 3,094,313
Patented June 18, 1963

3,094,313
RELEASABLE LOAD-SUSPENSION DEVICE
Urbain Filipozzi, Rue Alfred Labbe, Valleroy,
Meurthe-et-Moselle, France
Filed July 6, 1961, Ser. No. 122,318
Claims priority, application France July 12, 1960
7 Claims. (Cl. 254—196)

This invention relates to releasable load-suspension devices, more especially such devices of the type having a grooved pulley over which a rope is trained having a load attachable thereto, the pulley depending from a hook engageable with an overhead support from which the load is to be suspended, and which furthermore include releasing means whereby a pull exerted on one side of the rope from below, or similar appropriate action, will act to disengage the hook from its overhead support (such as a ring or hook of a hoisting apparatus), allowing the hook and pulley to drop to the ground.

Releasable load-suspension devices of this general class are of wide utility in connection with load-handling and hoisting equipment of various kinds. However, practical experience with available such devices shows that they are all open to one or more disadvantages. Thus in one such type of device the hook is pivoted to the top of a frame in which the pulley is rotatable and the hook has an extension which is normally applied into engagement with the pulley and/or rope by the weight of the load; a releasing member secured on the rope acts to disengage said extension and allow the hook to rotate to a position in which it disengages its overhead support when one end of the rope is pulled. In such a device the constant engagement of the hook extension is a source of rapid wear of the contacting surfaces. A big, awkwardly proportioned releasing member must be used and moreover, release can be obtained only by pulling on one end of the rope, since the member must obviously engage the hook extension from a prescribed side in order to be capable of lifting it.

In another common type of releasable suspension device, the hook is arranged to tend to be rotated to a disengaging position by the weight of the load, and is normally prevented from doing so by a latch engaging the tip of the hook, which latch can be retracted against spring bias about an axis parallel to the pivotal axis of the hook. The latching afforded by such a device is unreliable; moreover the device requires the use of a releasing member of complicated asymmetrical shape, which is inoperative should the rope become even moderately twisted.

Objects of this invention are to provide releasable load suspension means of the type described, which will be simple and robust in construction; highly reliable in operation both as to the positive latching action provided in the normal engaged position of the device and the ease with which the device can be moved to its released condition; wherein the device can be arranged for release by pulling one or the other side of the rope as desired; wherein the releasing action will be effective no matter how much the rope may be twisted at the time of release; and wherein there is substantially no wear on the parts in the engaged condition of the device. Other objects, as well as the novel features of the invention will stand out from the ensuing disclosure.

An exemplary embodiment of the invention is illustrated in the accompanying drawings, wherein:

FIG. 1 is an elevational view of a releasable load-suspension device according to the invention in engaged condition;

FIG. 2 is a similar view of the device disengaged;

FIG. 3 is a side view corresponding to FIG. 1;

FIG. 4 is a plan view of a portion of the rope and the releasing member attached thereon;

FIG. 5 is a section on line V—V of FIG. 1; and

FIG. 6 is a partial view similar to FIG. 5 in the disengaged condition of the device.

The releasable hook-and-pulley assembly illustrated comprises a pair of similar, symmetrically disposed lower side flanges 1 assembled in generally spaced parallel relative positions by means of a pair of bolts 2 extending through apertured portions having mating surfaces at the bottom end of the flanges. The flanges 1 are formed in their spaced, facing, surfaces with a pair of aligned central cavities 3 in which are provided bearings for rotatably supporting the axle or hub portion 4 of a grooved pulley 5. A rope 6 is trained over the pulley 5 in the groove thereof for attachment of a load, not shown, to the lower end of the rope.

Pivotally connected to the upper portions of the lower flanges 1 are a pair of respective upper flanges 12, in a manner now to be described. Each lower flange has a pair of spaced lugs 7 projecting from its outer surface, and each upper flange 12 has a pair of spaced lugs 11 projecting from its outer surface, the relative spacing being such, as shown e.g. in FIG. 1, that the upper lugs 11 can be positioned between the lower lugs 7; a pivot rod 8 is passed through alignable apertures formed in both lugs 7 and both lugs 11 and is retained in place by cotter pins 9. Thus each upper flange 12 is pivoted to the related lower flange 1 about an axis normal to the axis of pulley 5.

Aligned holes 13 formed in the tops of upper flanges 12 receive the ends of a pivot shaft 14 on which a hook 15 is freely pivoted. Pivot shaft 14 is retained by nuts 16 engaging the threaded outer ends of the pivot shaft whereby the latter simultaneously cooperates with the pivot rods 8 to retain the upper flanges 12 in their spaced, assembled relationship.

The hook has a projecting nose 17 formed to such a configuration on its under side that the uppermost point A of its under surface, which will be the point engaged by an overhead support such as a ring 18, in the suspended condition of the assembly, is substantially displaced horizontally to one side from the vertical plane containing the pivot axis 14 of the hook. Moreover, as shown, the under surface of nose 17 slants out continuously to the tip 19 of the hook, so that the weight of the load applies a force $p$ creating a couple tending to rock the hook 15 about its pivot axis to the disengaged position shown in FIG. 2, disengaging support 18.

Means are provided for normally preventing such rotation of the hook, and include a short radial extension 20 of the hook projecting towards the opposite side of the pivot 14 from hook 15, and a pair of similar latch levers 21 pivoted to the respective pivot rods 8 serving to interpivot the lower and upper flanges as earlier described. The latch levers 12 extend into the space between the flanges of the assembly through apertures 22 formed in the upper flanges 12, above the top of grooved pulley 5. The latch levers 21 are urged inwardly into engagement with each other by respective wire springs 23 each having a pair of spaced legs coiled about the related pivot 8 and having ends 23b abutting against the outer surface of the lower flange 1, which legs are interconnected by a transverse leg 23a bearing against the related latch member 21. Each lever 21 may be formed with a stop shoulder 21a engageable with the upper wall of aperture 22 to limit the inward rocking displacement of the levers 21.

In the normal or latching position shown especially in FIGS. 3 and 5, it will be seen that the latch levers 21 are rocked inwardly to a position in which they engage a front surface of the hook extension 20 thereby preventing the hook from being rocked to its disengaged position shown in FIG. 2. Preferably the engaging surfaces of extension 20 and both latch levers 21 may be flat and/or may be formed in any desired manner to provide a positive interlock and latching of the extension 20. The inner surfaces 21b of the latch levers are curved or otherwise formed to provide camming surfaces as will presently be made clear. These surfaces define with the underlying top surface of pulley 5 a space S of predetermined area for the penetration of the camming or releaser member now to be described.

The releaser member 24 (see FIG. 4) is adapted for engagement around the rope and for this purpose, in the present example, is slotted as at 25 so as to be resiliently blockable in any desired position along the rope after insertion thereof around an end of the rope. The member 24 is preferably in the form of a body of revolution, such as football-shaped, or as shown, it may include an intermediate cylindrical section and two frustoconical tapered end sections. Its dimensions are so predetermined with respect to the dimensions of the space S defined between the latch members 21, pulley 5 and side flanges, that either end of the member 24 will readily penetrate into said space and will then act on both surfaces 21a to cam the latch levers 21 away from each other a sufficient amount to clear the hook extension 20. At such time the hook is made free to rock under the weight of the load to the position shown in FIG. 2, disengaging the ring 18, and the whole assembly is allowed to fall to the ground.

As shown in FIG. 6 the rear surface 20a of hook extension 20 is suitably tapered or bevelled so as to be capable of camming the latch levers 21 apart against the action of springs 23 when the hook 15 is manually rotated in the direction shown by the arrow in FIG. 2 in order to reset the hook to its operative position for engagement with the ring 18.

It will be clear from the above disclosure that the releasable load device described achieves the various objects assigned to the invention. The latching action is positive and reliable especially since the reaction force of the hook extension is applied in a direction parallel to the pivot axes of the latch levers. Moreover said reaction force does not oppose the force applied to the latch levers when camming them apart, nor does it generate objectionable friction and wear in operation. Owing to the rotationally symmetrical shape of the camming releaser member, the positiveness of the releasing action is unimpaired even should the rope be severely twisted. Release can be obtained by pulling either one or the other side of the rope by simply locating the releaser member at a suitable position along the rope.

What I claim is:

1. A releasable load-suspension device comprising a frame, a pulley journalled in said frame and having a rope trainable thereover for attachment of a load, a hook pivoted to the frame above the pulley and engageable with an overhead support, so arranged that the weight of said load will tend to rotate the hook about its pivot to a disengaging position clear of said support, latching means pivoted to the frame for rotation in a plane normal to the plane of hook rotation and means normally urging said latching means into engagement with a surface of said hook to prevent rotation thereof to said disengaging position, and a camming element positionable on said rope for camming engagement with said latching means whereby a pull applied to one side of the rope to draw the camming element past said latching means will cam the latter away from said hook surface to release the hook for rotation to said disengaging position.

2. A releasable load-suspension device comprising a frame, a pulley journalled in the frame and having a rope trainable thereover for attachment of a load, a hook pivoted to the frame above the pulley and engageable with an overhead support and so arranged that the weight of the load will tend to rotate the hook to a disengaging position, a pair of latch members pivoted to the frame about axes normal to the hook pivot axis and means urging said members into engagement with a surface of said hook to prevent said rotation thereof, and a camming element positionable on the rope for camming engagement with said latching members whereby pulling the rope to draw the camming element past the latch members will cam the latch members away from said hook surface to release the hook for rotation to said disengaging position.

3. A releasable load suspension device comprising a pair of spaced flange means, a pulley journalled across the flange means and having a rope trainable thereover for attachment of a load, a hook pivoted across said flange means about an axis parallel to and spaced above the pulley axis and engageable with an overhead support that the weight of the load will tend to rotate the hook clear of said support, said hook having an extension beyond said pivot axis, a pair of latch levers pivoted to the respective flange means about axes normal to said first axis and means urging the latch levers inwards into engagement with said hook extension to prevent said hook rotation, and a camming member carried by the rope and engageable with said levers as said member is drawn therepast to cam said levers outwards whereby to release the hook for rotation clear of the support.

4. A releasable load suspension device comprising a pair of spaced interassembled lower flanges, a pair of upper flanges pivoted to the tops of said lower flanges about spaced horizontal axes parallel to the general planes of said flanges, a pulley journalled across the lower flanges and having a rope trainable thereover for attachment of a load, a hook pivoted across the upper flanges and engageable with an overhead support and so formed that the weight of the load will tend to rotate the hook clear of said support, said hook having an extension beyond said pivot axis thereof, a pair of latch levers pivoted to the respective upper and lower flanges coaxially with said spaced horizontal axes, apertures in the upper flanges through which the respective levers can be rotated inwardly in between said flanges, spring means urging said levers inwardly through said apertures into engagement with said hook extension, thereby to prevent said hook rotation, and a camming member carried on the rope and engageable with said levers to cam the same away from said extension to release the hook for rotation clear of the support.

5. The device claimed in claim 1, wherein said camming element has a surface provided with rotational symmetry and has an enlarged intermediate section and outwardly tapering end sections.

6. The device claimed in claim 3, wherein said hook extension has a camming surface directed towards said latch levers in the released position of the hook for camming said levers apart for resetting the hook to its engaging position.

7. The device claimed in claim 3, wherein said latch levers and said hook extension have flat complementary latching surfaces.

References Cited in the file of this patent
UNITED STATES PATENTS

| | | |
|---|---|---|
| 79,653 | Gustin | July 7, 1868 |
| 610,172 | Dotson | Sept. 6, 1898 |